United States Patent
Segev et al.

(10) Patent No.: US 11,561,735 B2
(45) Date of Patent: Jan. 24, 2023

(54) LATENCY ON INDIRECT ADMIN COMMANDS

(71) Applicant: Western Digital Technologies, Inc., San Jose, CA (US)

(72) Inventors: Amir Segev, Meiter (IL); Shay Benisty, Beer Sheva (IL); David Meyer, Lakewood, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 31 days.

(21) Appl. No.: 17/349,598

(22) Filed: Jun. 16, 2021

(65) Prior Publication Data
US 2022/0405011 A1 Dec. 22, 2022

(51) Int. Cl.
*G06F 3/06* (2006.01)
(52) U.S. Cl.
CPC .......... *G06F 3/0659* (2013.01); *G06F 3/0611* (2013.01); *G06F 3/0673* (2013.01)
(58) Field of Classification Search
CPC ..... G06F 3/0659; G06F 3/0611; G06F 3/0673
See application file for complete search history.

(56) References Cited

U.S. PATENT DOCUMENTS

| | | | |
|---|---|---|---|
| 10,509,569 B2* | 12/2019 | Richter | G06F 13/1668 |
| 11,032,123 B1* | 6/2021 | Bernat | H04L 67/1097 |
| 2019/0155760 A1* | 5/2019 | Chang | G06F 13/18 |
| 2019/0278523 A1* | 9/2019 | Benisty | G06F 3/0659 |
| 2021/0132860 A1* | 5/2021 | Kou | G06F 9/5077 |

* cited by examiner

*Primary Examiner* — Zhuo H Li
(74) *Attorney, Agent, or Firm* — Patterson & Sheridan, LLP; Steven H. VerSteeg

(57) ABSTRACT

A data storage device includes a memory device and a controller coupled to the memory device. The controller is configured to receive a parent physical function (PF), receive one or more child PFs, determine whether any part of a first child command of a first child PF of the one or more child PFs can be executed prior to receiving approval from the parent PF, and start executing the first child command. The controller is further configured to initialize an indirect queue, set fetching pointers of the indirect queue to the first child command, mimic a doorbell for the first child command, fetch the first child command, determine whether the first child command has started execution by a child PF flow, and complete the first child command.

17 Claims, 6 Drawing Sheets

LATENCY ON INDIRECT ADMIN COMMANDS

BACKGROUND OF THE DISCLOSURE

Field of the Disclosure

Embodiments of the present disclosure generally relate to data storage devices, such as solid state drives (SSDs), working with multiple physical functions (PFs).

Description of the Related Art

When working with multiple PFs of a host device, a data storage device, such as a SSD, requires a higher degree of security. PFs include a parent PF and one or more child PFs, where the parent PF monitors the admin commands of the child PFs. When the child PF attempts to send an admin command (e.g., format namespace), a controller of the data storage device waits for the parent PF to approve or deny the admin command of the child PF. If the parent PF denies the admin command, the admin command is completed with a relevant error indication. If the admin command is approved, the data storage device fetches, parses, and executes the admin command.

However, while working with multiple PFs, several issues may arise. For example, the internal command pool may be fully occupied by pending child PF admin commands, which may result in a deadlock. Thus, the parent PF command may be blocked from being fetched due to the full internal command pool. In another example, the hardware may need to be stopped and the admin command may not be fetched upon receiving a doorbell (e.g., notification). In yet another example, an admin command timeout starts from when the child PF issues the command. Waiting for the parent PF to approve/deny the admin command may result in further delays to the execution of the admin command.

Therefore, there is a need in the art for improved admin command handling.

SUMMARY OF THE DISCLOSURE

The present disclosure generally relates to data storage devices, such as solid state drives (SSDs), working with multiple physical functions (PFs). A data storage device includes a memory device and a controller coupled to the memory device. The controller is configured to receive a parent PF, receive one or more child PFs, determine whether any part of a first child command of a first child PF of the one or more child PFs can be executed prior to receiving approval from the parent PF, and start executing the first child command. The controller is further configured to initialize an indirect queue, set fetching pointers of the indirect queue to the first child command, mimic a doorbell for the first child command, fetch the first child command, determine whether the first child command has started execution by a child PF flow, and complete the first child command.

In one embodiment, a data storage device includes a memory device and a controller coupled to the memory device. The controller is configured to receive a parent physical function (PF), receive one or more child PFs, determine whether any part of a first child command of a first child PF of the one or more child PFs can be executed prior to receiving approval from the parent PF, and start executing the first child command.

In another embodiment, a data storage device includes a memory device and a controller coupled to the memory device. The controller is configured to receive a parent PF, receive one or more child PFs, determine whether a first child command of a first child PF of the one or more child PFs is approved by the parent PF, initialize an indirect queue, set fetching pointers of the indirect queue to the first child command, mimic a doorbell for the first child command, fetch the first child command, determine whether the first child command has started execution by a child PF flow, and complete the first child command.

In another embodiment, a data storage device includes memory means and a controller coupled to the memory means. The controller is configured to receive a parent PF, receive one or more child PFs, and begin processing a first child command associated with a first child PF of the one or more child PFs, wherein the processing occurs prior to receiving approval from a first parent command of the parent PF.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), working with multiple physical functions (PFs). A data storage device includes a memory device and a controller coupled to the memory device. The controller is configured to receive a parent PF, receive one or more child PFs, determine whether any part of a first child command of a first child PF of the one or more child PFs can be executed prior to receiving approval from the parent PF, and start executing the first child command. The controller is further configured to initialize an indirect queue, set fetching pointers of the indirect queue to the first child command, mimic a doorbell for the first child command, fetch the first child command, determine whether the first child command has started execution by a child PF flow, and complete the first child command.

Figure 1:
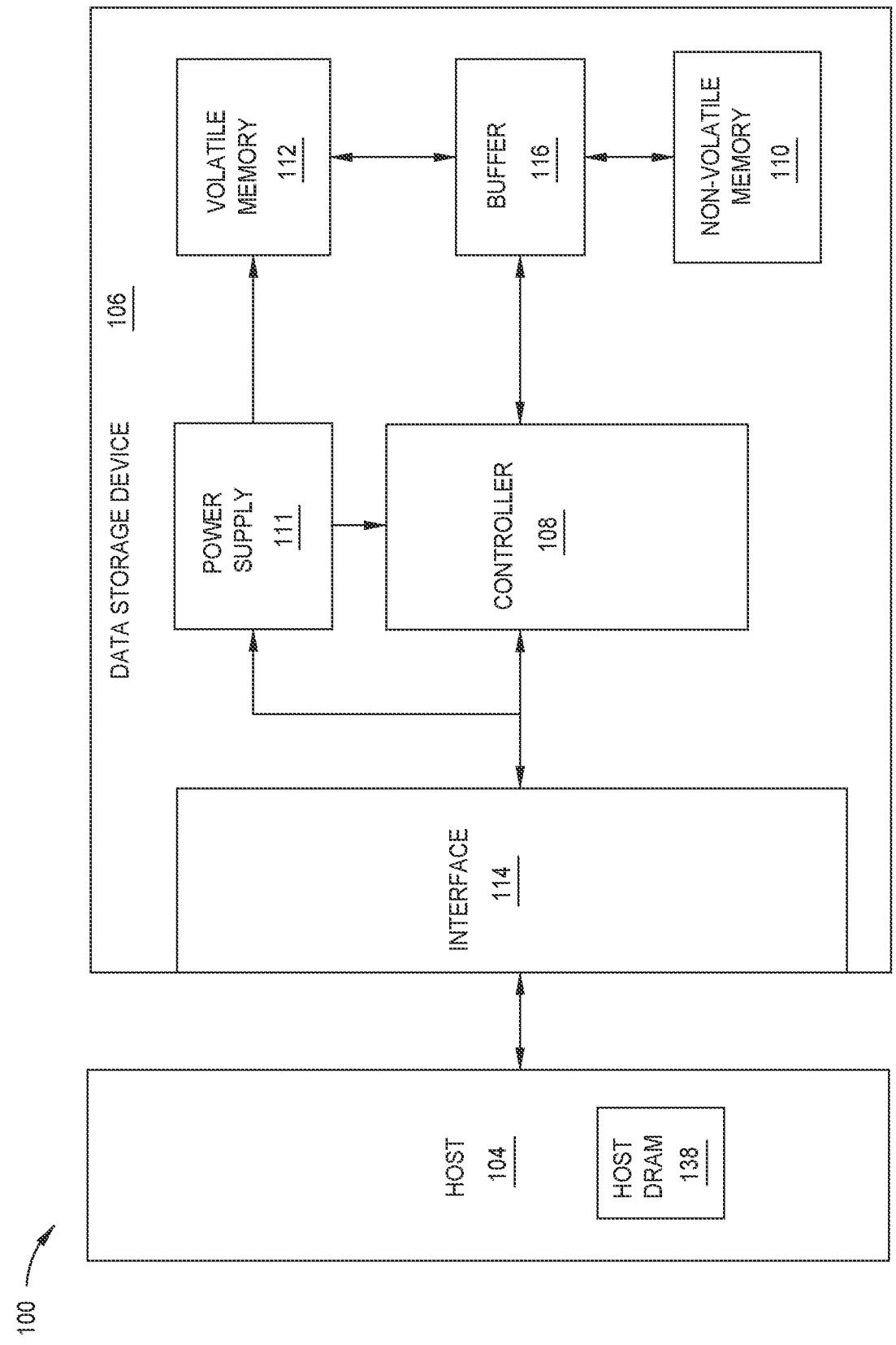
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
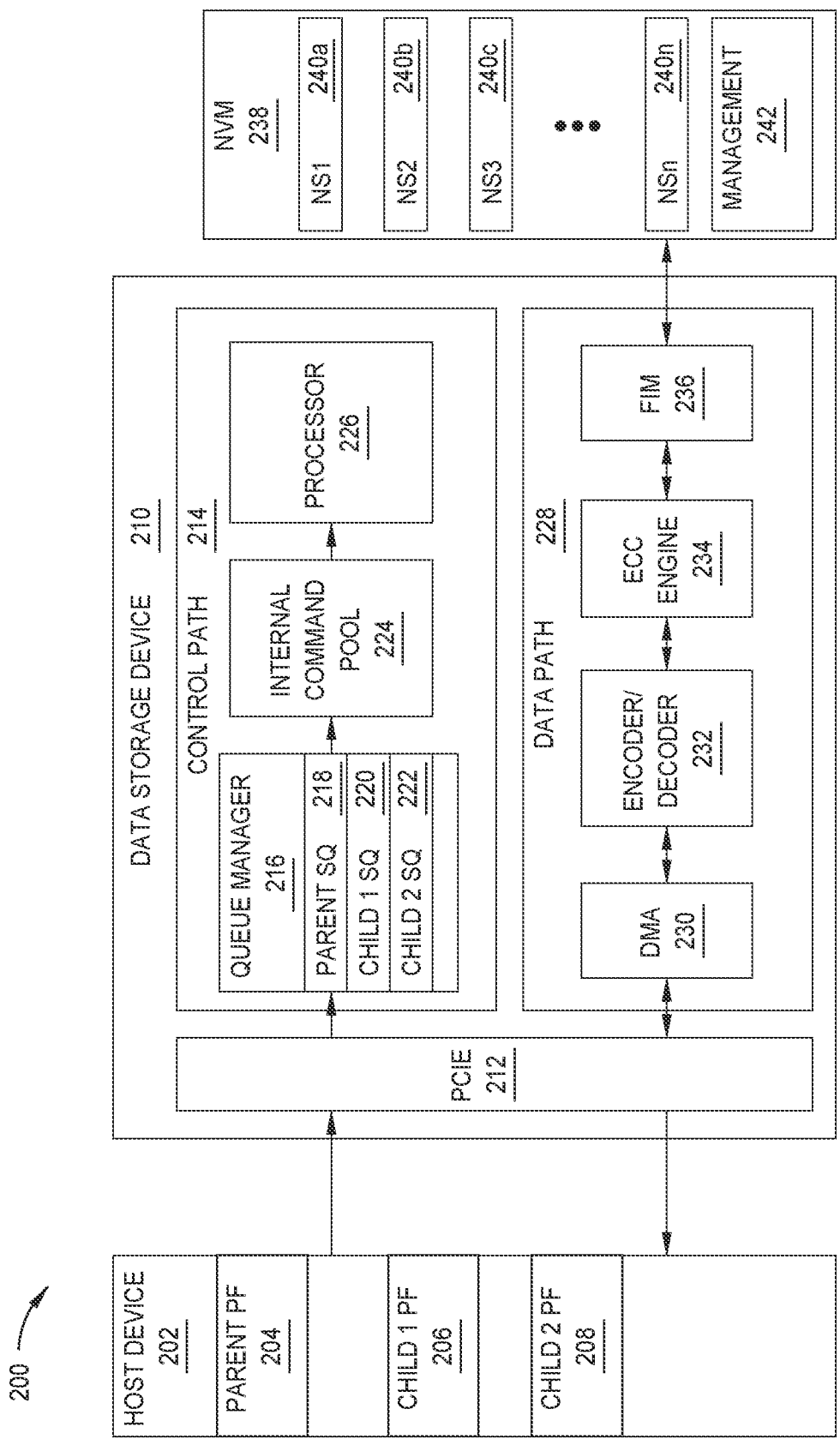
FIG. 2 is a schematic block diagram illustrating a storage system in which a data storage device may function as a storage device for a host device, according to certain embodiments.

FIG. 2 is a schematic block diagram illustrating a storage system 200 in which a data storage device 210 may function as a storage device for a host device 202, according to certain embodiments. Aspects of the storage system 200 may be similar to aspects of the storage system 100. The host device 202 includes a parent physical function (PF) 204, a first child PF 206, and a second child PF 208. It is to be understood that the host device 202 may include one or more child PFs and the number of PFs depicted in the storage system 200 is an exemplary embodiment. The parent PF 204 may be utilized for administration purposes, such as allocating resources, priorities, bandwidth, memory namespace formatting/allocation, and the like. The child PFs 206, 208 may be utilized for raw data transfers.

The host device 202 is coupled to the data storage device 210. The data storage device 210 includes a PCIe bus 212, a control path 214, and a data path 228. It is to be understood that the PCIe bus 212 is an example of a bus that the data storage device 210 may include. In other examples, the data storage device 210 may alternatively or additionally include busses associated with the following: advanced technology attachment (ATA) (e.g., serial-ATA (SATA) and parallel-ATA (PATA)), Fibre Channel Protocol (FCP), small computer system interface (SCSI), serially attached SCSI (SAS), PCI, non-volatile memory express (NVMe), OpenCAPI, GenZ, Cache Coherent Interface Accelerator (CCIX), Open Channel SSD (OCSSD), or the like. Data and commands are transferred from the host device 202 to the PCIe bus 212 of the data storage device 210. The commands are then transferred to the control path 214 and the data of the commands are transferred to the data path 228. A controller, such as the controller 108 of FIG. 1, may include the control path 214 and the data path 228.

The control path 214 includes a queue manager 216, an internal command pool 224, and a processor 226. In some examples, the control path 214 includes one or more processors. The queue manager 216 may handle the fetching of commands from the host device 202. The queue manager 216 includes a parent submission queue (SQ) 218, a first child SQ 220, and a second child SQ 222. The parent SQ 218 includes commands generated by the parent PF 204. The first child SQ 220 includes commands generated by the first child PF 206 and the second child SQ 222 includes commands from the second child PF 208. The queue manager 216 may include as many child SQs as the number of child PFs of the host device 202. The internal command pool 224 stores the host commands and the processor 226 processes the admin commands and triggers the data path of the commands, such as the input/output of data corresponding to the command.

The data path 228 includes a direct memory access (DMA) 230, an encoder/decoder 232, an error correction code (ECC) engine 234, and a flash interface module (FIM) 236. The DMA 230 may allow for access of NVM 238 independent of the processor 226 or a central processing unit (CPU). In some examples, the DMA 230 facilitates the access of the NVM 238 to allow for data to be programmed to or read from the NVM 238. The encoder/decoder 232 may be configured to encode data prior to being programmed to the NVM 238 and decode data read from the NVM 238. It is to be understood that the encoder/decoder 232 may be separate components of the data storage device 210. The ECC engine 234 is configured to generate ECC data to protect the data programmed to the NVM 238 from errors. It is contemplated that the ECC engine 234 may be another type of data protection engine such as a low-density parity-check (LDPC) engine configured to generate LDPC data or an exclusive or (XOR) parity engine configured to generate XOR parity data. The ECC engine 234 may be configured to generate protection code and execute error correction operations. The FIM 236 may be configured to schedule data to be programmed to the NVM 238, access the NVM 238, and/or schedule data to be read from the NVM 238.

The FIM 236 is coupled to the NVM 238. The NVM 238 includes a plurality of namespaces 240a-240n. The plurality of namespaces 240a-240n may be part of a zoned namespace (ZNS) protocol. Each of the plurality of namespaces 240a-240n may be a logical configuration of memory dies or memory blocks of the NVM 238. For example, a first namespace NS1 240a may include a first block of each plane of each die of the memory device. It is contemplated that other configurations are applicable to the embodiments described. Each namespace of the plurality of namespaces 240a-240n may be provided to one or more of the child PFs 206, 208. Each child PF 206, 208 may have multiple namespaces. For example, the first child PF 206 may be associated with the first namespace 240a and a second namespace 240b. The NVM 238 further includes a management block 242. The management block 242 stores management information, such as the structure, health, one or more security keys, and any other relevant information of the data storage device 210 not directly related to the user data stored in the plurality of namespaces 240a-240n.

Figure 3:
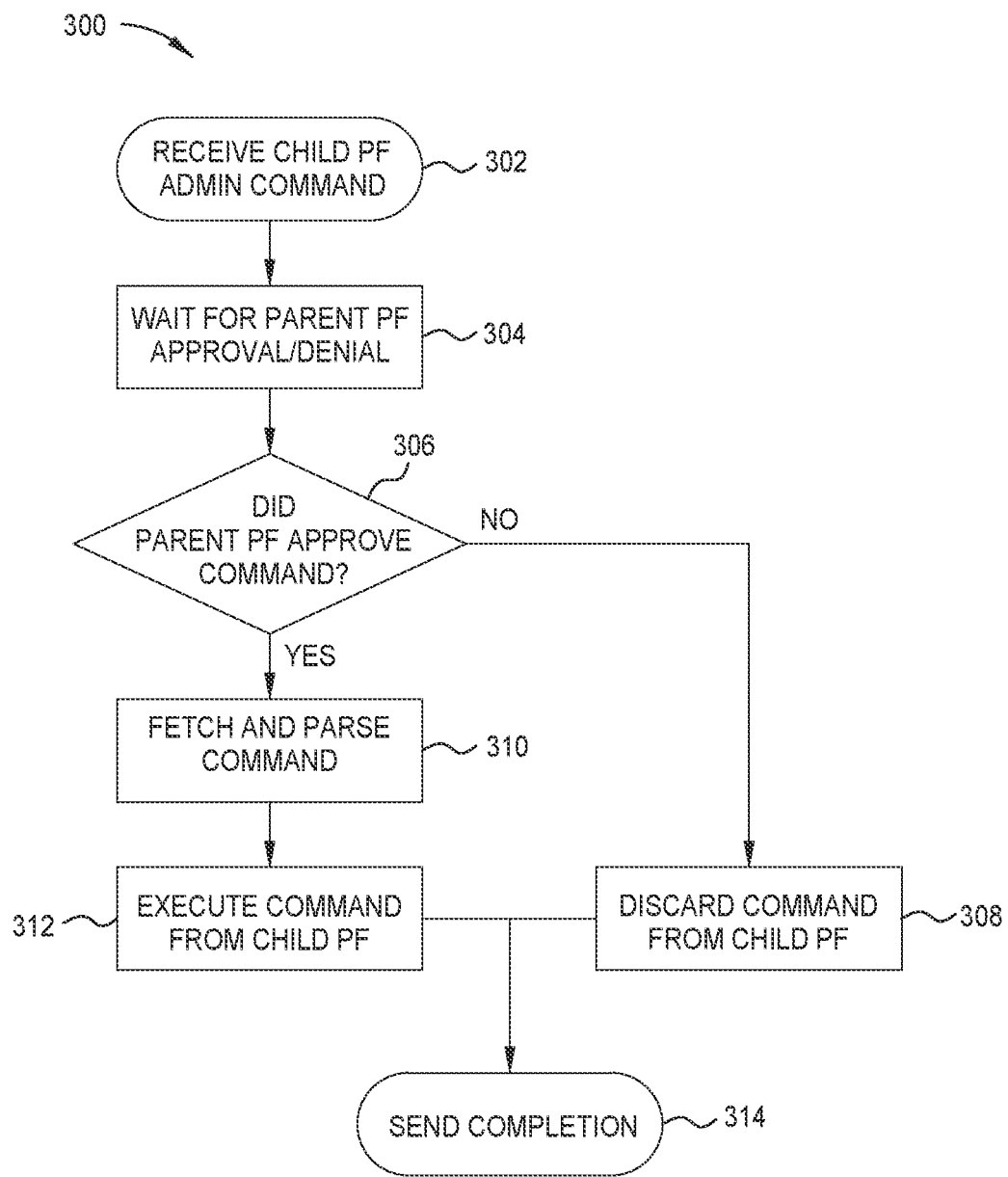
FIG. 3 is a flow diagram illustrating a method of executing a child PF admin command, according to certain embodiments.

FIG. 3 is a flow diagram illustrating a method 300 of executing a child PF admin command, according to certain embodiments. Method 300 may be executed by the controller 108 of FIG. 1 or the data storage device 210 of FIG. 2. At block 302, the controller 108 receives a child PF admin command generated by a child PF, such as the first child PF 206 or the second child PF 208. At block 304, the controller 108 waits for a parent PF, such as the parent PF 204, approval or denial command. At block 306, the controller 108 determines if the parent PF 204 approved the child PF admin command. If the parent PF 204 did not approve the child PF admin command at block 306, then the child PF admin command is discarded at block 308. However, if the parent PF 204 approved the child PF admin command at block 306, then the controller fetches the child PF command from the relevant SQ, such as the first child SQ 220, and parses the child PF admin command at block 310. At block 312, the child PF admin command is executed. At block 314, a completion message is sent back to a relevant host device, such as the host device 202. The completion message may either be a relevant error indication or a completion message associated with successfully executing the child PF admin command.

The latency of the approval/denial flow of method 300 may be impacted if the internal command pool, such as the internal command pool 224 of FIG. 2, is fully occupied by pending child PF admin commands, if the hardware automation needs to be stopped, and/or if a command timeout starts from when the child PF 206, 208 issues the child PF admin command. If the command pool 224 is fully occupied by pending child PF admin commands, a deadlock may occur, where the parent PF command (i.e., the approve/deny command) might be blocked from being fetched. Likewise, if the hardware automation needs to be stopped, the parent PF command may not be fetched upon receiving a doorbell for an issued child PF admin command. Similarly, if the parent PF 204 has not sent an approve/deny command, the execution of the pending child PF command may be delayed.

Figure 4A:
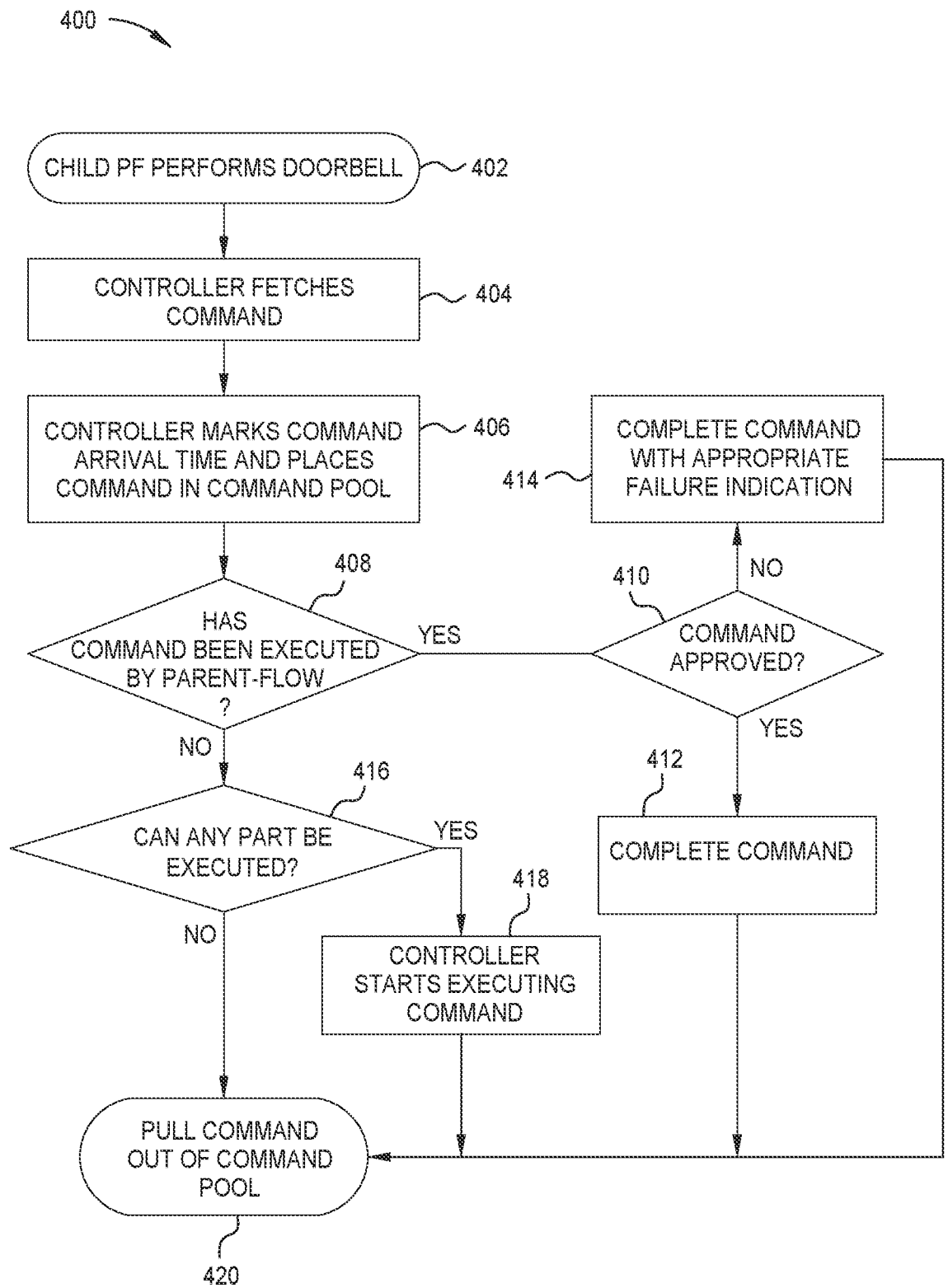
FIGS. 4A and 4B are a flow diagrams illustrating methods of indirect admin command execution, according to certain embodiments.
Figure 4B:
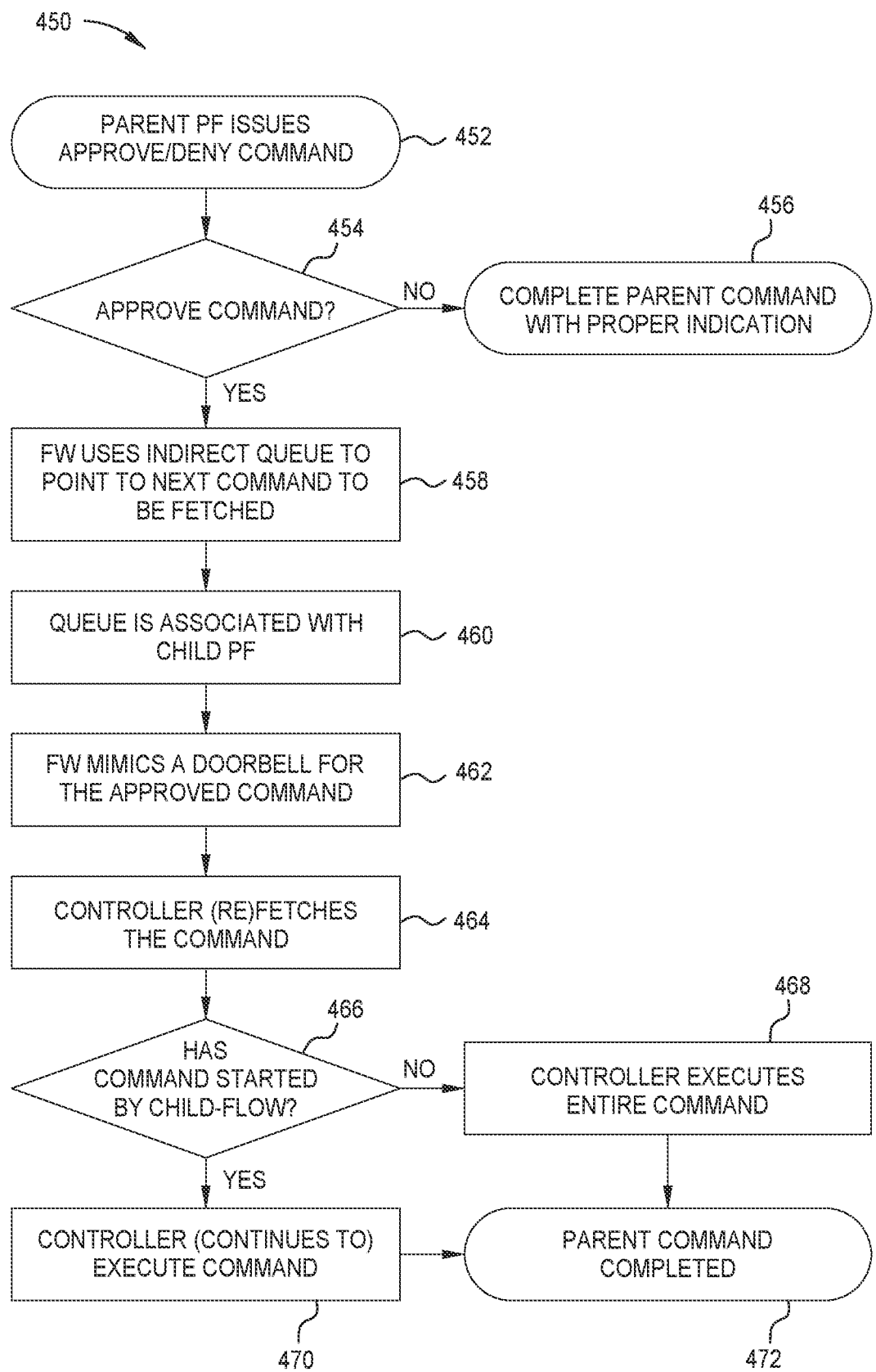

FIGS. 4A and 4B are a flow diagrams illustrating methods 400, 450 of indirect admin command execution, according to certain embodiments. Methods 400 and 450 may be completed concurrently with each other. Furthermore, methods 400 and 450 may be executed by a controller, such as the controller 108 of FIG. 1, of a data storage device, such as the data storage device 210 of FIG. 2. For exemplary purposes, aspects of the storage system 200 of FIG. 2 may be referenced. Method 400 may be related to a child PF, such as the first child PF 206 or the second child PF 208 of FIG. 2. Method 450 may be related to a parent PF, such as the parent PF 204 of FIG. 2. Furthermore, references to a "parent-flow" may refer to the method 450 and references to a "child-flow" may refer to the method 400. It is noted that the term "command" used herein is for simplification purposes and may actually refer to an "admin command."

Regarding method 400, at block 402, the child PF 206, 208 performs a doorbell. The doorbell may be an indication or a notification sent by the host device 202 to the controller 108 indicating that the host device 202 has a pending command stored in a host DRAM, such as the host DRAM 138 of FIG. 1, that is ready to be fetched. At block 404, the queue manager 216 of the controller 108 tracks the state of the SQs 218, 220, 222, fetches the command from the relevant child PF 206, 208, and places the command in a respective SQ. For example, if the first child PF 206 generates the command and the controller 108 fetches the command from the first child PF 206, the command is placed in the first child SQ 220. At block 406, the queue manager 216 marks the command with its arrival time (e.g., generates a timestamp for the command) and places the command in the internal command pool 224. At block 408, the controller 108 determines if the command has been executed by the parent-flow. If the command has been executed by the parent flow, then at block 410, the controller 108 determines if the command has been approved by the parent PF 204. If the parent PF 204 does not approve the command at block 410, then the command is completed with the appropriate failure indication at block 414 and the command is pulled out of the command pool at block 420. However, if the command has been approved by the parent PF 204 at block 410, then the command is completed (i.e., executed) at block 412 and the command is pulled out of the command pool at block 420.

If the command has not been executed by the parent-flow at block 408, then the controller 108 checks if any part of the command can be executed at block 416. For example, the checking may allow for the certain parts of the command to be executed or prepared to be executed prior to executing the command. If any part of the command can be executed at block 416, the controller 108 starts executing the parts of the command that can be executed at block 418. The command will eventually be pulled out of the command pool at block 420. It is noted that the parts of the command that is executed are parts that may not affect the data storage device if the command is denied by the parent PF 204. However, if no parts of the command can be executed at block 416, then the command is pulled out of the internal command pool 224 at block 420. After the command is completed at block 412, executed at block 418, or completed with the appropriate failure indication at block 414, the command is pulled out of the internal command pool at block 420.

Referring to method 450, when the child PF 206, 208 generates a command and sends a doorbell to the data storage device 210, the parent PF 204 issues an approve/deny command for the command at block 452. At block 454, the controller 108 determines if the approval command is received. If the deny command is received at block 454, such that the child PF admin command is not approved, the parent command is completed with proper indication at block 456. The child-flow is aborted and both the command and the deny command are completed with the appropriate statuses.

However, if the approve command is received at block 454, the firmware (i.e., the controller 108) uses an indirect queue to point to the next command to be fetched at block 458. Furthermore, the approve command includes the index (and in some embodiments, the number) of commands that are approved for a given child PF. The indirect queue may be part of the queue manager 216. The indirect queue may be initialized by the firmware (i.e., the controller 108), where the firmware sets fetching pointers to the next command to be fetched, such as pointing to the next command to be fetched at block 458. At block 460, the indirect queue is associated with one or more child PF indices. For example, at block 460, the indirect queue is associated with the child PF associated with the command.

At block 462, the firmware (i.e., the controller 108) mimics a doorbell for the approved command. At block 464, the controller 108 re-fetches the command from the relevant child PF 206, 208 and placed in the internal command pool 224. The re-fetching of the command includes fetching the same command (e.g., the approved command) from the relevant child PF 206, 208. At block 466, the controller 108 determines if the command has been started by the child-flow. If the command has not been started by the child-flow at block 466, then the controller 108 executes the entire command at block 468. However, if the command has been started by the child-flow at block 466, then the controller 108 continues to execute the command at block 470. Because the command has already been started by the child-flow at block 466, time may be saved executing the command. At block 472, the parent command is completed.

Figure 5:
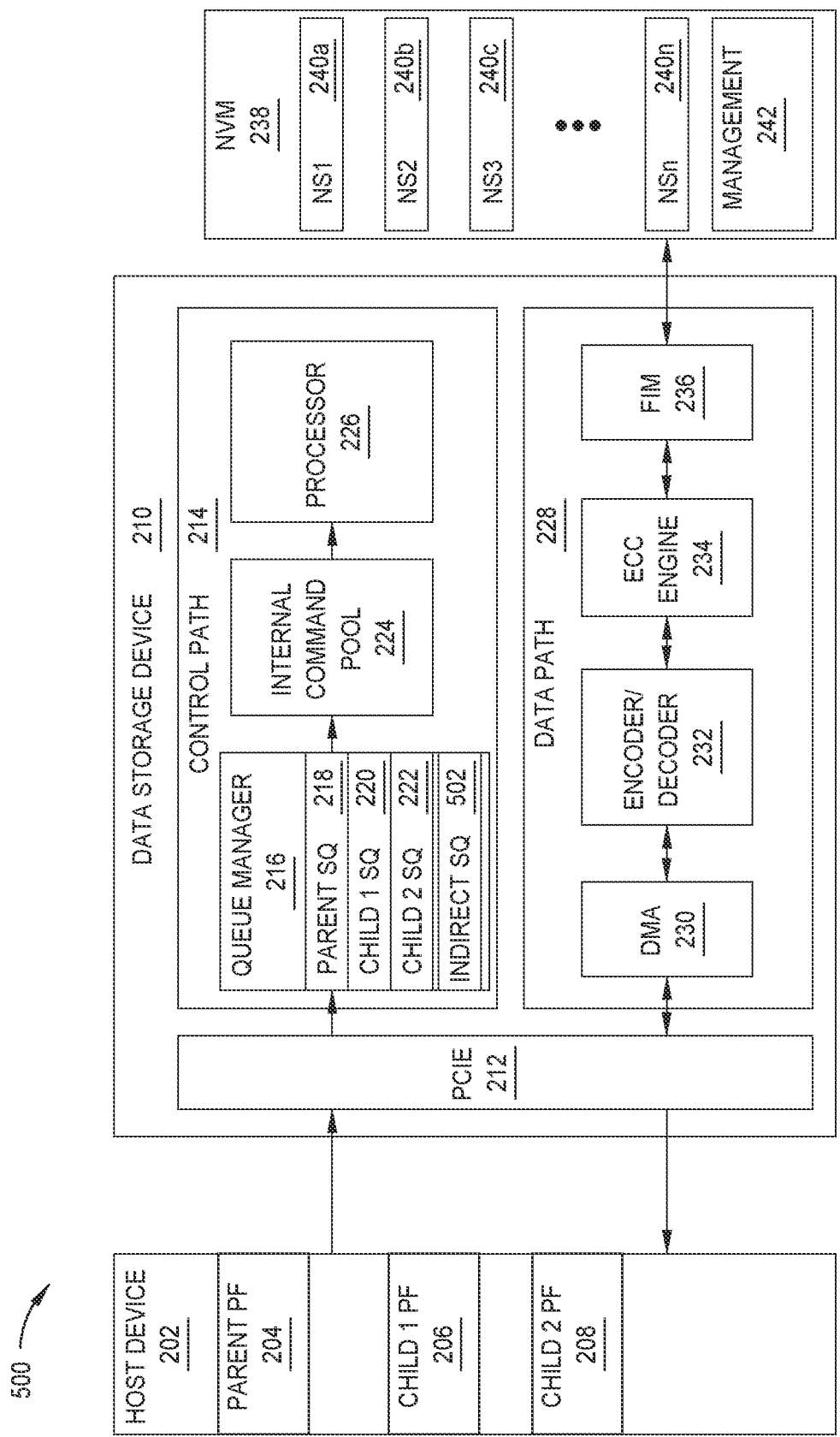
FIG. 5 is a schematic block diagram illustrating a storage system in which a data storage device may function as a storage device for a host device, according to certain embodiments.

FIG. 5 is a schematic block diagram illustrating a storage system 500 in which a data storage device 210 may function as a storage device for a host device 202, according to certain embodiments. The storage system 500 is similar to the storage system 200 of FIG. 2. Thus, similar reference numerals are utilized to refer to similar components. The queue manager 216 further includes an indirect SQ 502. The indirect SQ 502 includes fetching pointers for the next command to be fetched and is associated with one or more child PF indices. The fetching pointers may be set and modified by the firmware or a controller, such as the controller 108 of FIG. 1. Furthermore, the fetching pointers may point to the relevant child PF SQ, such to the first child SQ 220 or the second child SQ 222. For example, a first set of fetching pointers may point to the first child SQ 220 and a second set of fetching pointers may point to the second child SQ 222.

By including both child-flow and parent-flow, the latency of executing the child PF commands may be reduced and the operations of the data storage device may be improved.

In one embodiment, a data storage device includes a memory device and a controller coupled to the memory device. The controller is configured to receive a parent physical function (PF), receive one or more child PFs, determine whether any part of a first child command of a first child PF of the one or more child PFs can be executed prior to receiving approval from the parent PF, and start executing the first child command.

The controller is further configured to fetch the first child command from a child submission queue, mark a command arrival time for the first child command, and place the first child command in a command pool. The controller is further configured to determine whether the first child command has been executed by a parent PF command. The controller is further configured to pull the first child command out of the command pool. The controller is further configured to receive an approval to execute the first child command after starting to execute the first child command. The controller is further configured to complete execution of the first child command prior to receiving approval to execute the first child command. The controller is further configured to withhold sending a completion message to a host regarding the first child command until after receiving the approval to execute the first child command. The controller is further configured to determine whether the first child command has been executed by a parent PF flow. The controller is further configured to determine whether the first child command has been approved after determining that the first child command has been executed by the parent PF flow.

In another embodiment, a data storage device includes a memory device and a controller coupled to the memory device. The controller is configured to receive a parent PF, receive one or more child PFs, determine whether a first child command of a first child PF of the one or more child PFs is approved by the parent PF, initialize an indirect queue, set fetching pointers of the indirect queue to the first child command, mimic a doorbell for the first child command, fetch the first child command, determine whether the first child command has started execution by a child PF flow, and complete the first child command.

The controller is further configured to determine that the first child command has already started execution by the child PF flow. The controller is further configured to continue to execute the first child command. The first child command is fetched from a child submission queue. The initialized queue includes the first child command and first child command pointers, wherein the first child command pointers point to the child submission queue, and wherein the child submission queue comprises the first child command. The initialized queue further includes second command pointers, wherein the second command pointers point to a different location than the first child command pointers. The controller is further configured to begin executing the first child command prior to the approval. The controller is further configured to fetch the first child command twice.

In another embodiment, a data storage device includes memory means and a controller coupled to the memory means. The controller is configured to receive a parent PF, receive one or more child PFs, and begin processing a first child command associated with a first child PF of the one or more child PFs, wherein the processing occurs prior to receiving approval from a first parent command of the parent PF.

The controller is further configured to determine whether the first child command has started processing, wherein the determining occurs after the approval. The controller is configured to initialize an indirect queue, wherein the indirect queue comprises the first child command a pointers to child submission queue that also comprises the first child command. The controller is configured to mark a time of arrival of the first child command and place the first child command into a command pool.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a controller coupled to the memory device, wherein the controller is configured to:
receive a parent physical function (PF);
receive one or more child PFs;
fetch a first child command of a first child PF of the one or more child PFs from a child submission queue;
mark a command arrival time for the first child command;
place the first child command in a command pool;

determine whether any part of the first child command of the first child PF of the one or more child PFs can be executed prior to receiving approval from the parent PF; and start executing the first child command.

2. The data storage device of claim 1, wherein the controller is further configured to determine whether the first child command has been executed by a parent PF command.

3. The data storage device of claim 1, wherein the controller is further configured to pull the first child command out of the command pool.

4. The data storage device of claim 1, wherein the controller is further configured to receive an approval to execute the first child command after starting to execute the first child command.

5. The data storage device of claim 1, wherein the controller is further configured to complete execution of the first child command prior to receiving approval to execute the first child command.

6. The data storage device of claim 5, wherein the controller is further configured to withhold sending a completion message to a host regarding the first child command until after receiving the approval to execute the first child command.

7. A data storage device, comprising:
a memory device; and
a controller coupled to the memory device, wherein the controller is configured to:
receive a parent physical function (PF);
receive one or more child PFs;
determine whether the first child command has been executed by a parent PF flow;
determine whether any part of a first child command of a first child PF of the one or more child PFs can be executed prior to receiving approval from the parent PF; and
start executing the first child command.

8. The data storage device of claim 7, wherein the controller is further configured to determine whether the first child command has been approved after determining that the first child command has been executed by the parent PF flow.

9. A data storage device, comprising:
a memory device; and
a controller coupled to the memory device, wherein the controller is configured to:
receive a parent physical function (PF);
receive one or more child PFs;
determine whether a first child command of a first child PF of the one or more child PFs is approved by the parent PF, wherein the first child command is fetched from a child submission queue;
initialize an indirect queue, wherein the initialized indirect queue comprises:
the first child command and first child command pointers, wherein:
the first child command pointers point to the child submission queue; and
the child submission queue comprises the first child command; and
second command pointers, wherein the second command pointers point to a different location than the first child command pointers;
set fetching pointers of the indirect queue to the first child command;
mimic a doorbell for the first child command;
fetch the first child command;
determine whether the first child command has started execution by a child PF flow; and
complete the first child command.

10. The data storage device of claim 9, wherein the controller is further configured to determine that the first child command has already started execution by the child PF flow.

11. The data storage device of claim 10, wherein the controller is further configured to continue to execute the first child command.

12. The data storage device of claim 9, wherein the first child command is fetched from a child submission queue.

13. The data storage device of claim 9, wherein the controller is further configured to begin executing the first child command prior to the approval.

14. The data storage device of claim 9, wherein the controller is further configured to fetch the first child command twice.

15. A data storage device, comprising:
memory means; and
a controller coupled to the memory means, wherein the controller is configured to:
receive a parent physical function (PF);
receive one or more child PFs;
mark a time of arrival of the first child command and place the first child command into a command pool; and
begin processing a first child command associated with a first child PF of the one or more child PFs, wherein the processing occurs prior to receiving approval from a first parent command of the parent PF.

16. The data storage device of claim 15, wherein the controller is further configured to determine whether the first child command has started processing, wherein the determining occurs after the approval.

17. The data storage device of claim 15, wherein the controller is configured to initialize an indirect queue, wherein the indirect queue comprises the first child command a pointers to child submission queue that also comprises the first child command.

* * * * *